United States Patent
Matsuda et al.

(10) Patent No.: US 7,760,383 B2
(45) Date of Patent: Jul. 20, 2010

(54) MULTIPLE FUNCTION IMAGE FORMATION DEVICE AND METHOD INCLUDING MASTER AND SUB-SERVICE FUNCTIONS

(75) Inventors: Toru Matsuda, Kanagawa (JP); Sachiko Takeuchi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1191 days.

(21) Appl. No.: 11/231,900

(22) Filed: Sep. 22, 2005

(65) Prior Publication Data

US 2006/0066898 A1   Mar. 30, 2006

(30) Foreign Application Priority Data

Sep. 27, 2004   (JP)   ................ 2004-279661

(51) Int. Cl.
G06F 3/12 (2006.01)
G06F 15/16 (2006.01)
G06K 15/00 (2006.01)

(52) U.S. Cl. .................. 358/1.15; 358/1.14; 709/203; 709/208; 709/209

(58) Field of Classification Search ............. 358/1.14, 358/1.15; 709/203, 208, 209
See application file for complete search history.

(56) References Cited

U.S. PATENT DOCUMENTS

| 2003/0063316 | A1 | 4/2003 | Irino |
| 2004/0070782 | A1 | 4/2004 | Mihira |
| 2004/0080771 | A1* | 4/2004 | Mihira et al. ............... 358/1.13 |
| 2004/0095602 | A1* | 5/2004 | Sugishita et al. ........... 358/1.16 |
| 2004/0199538 | A1 | 10/2004 | Matsuda et al. |
| 2004/0227968 | A1 | 11/2004 | Nakamura et al. |
| 2004/0236862 | A1 | 11/2004 | Ito et al. |
| 2005/0267935 | A1* | 12/2005 | Gandhi et al. ............... 709/203 |

FOREIGN PATENT DOCUMENTS

| EP | 1 311 107 A2 | 5/2003 |
| JP | 2000-287012 | 10/2000 |
| JP | 2003-341175 | 12/2003 |
| JP | 2004-114674 | 4/2004 |

* cited by examiner

*Primary Examiner*—Twyler L Haskins
*Assistant Examiner*—Fred Guillermety
(74) *Attorney, Agent, or Firm*—Oblon, Spivak, McClelland, Maier & Neustadt, L.L.P.

(57) ABSTRACT

An image formation device is disclosed that has service functions corresponding to a configuration of the image formation device. The image formation device includes a service function unit for processing a request for a service function. The service function unit includes a master service function section and plural sub service function sections. One of the sub service function sections assuming an operating state requests the master service function section to register the one of the sub service function sections; the master service function section assigns the service function request to the one of the sub service function sections according to a type of the service function request; and the one of the sub service function sections processes the service function request assigned by the master service function section.

21 Claims, 15 Drawing Sheets

FIG.5

| CLASS | DESCRIPTION | NAME | DESCRIPTION |
|---|---|---|---|
| TIME | | TIME | YYYY-MM-DDThh:mm:ssZ |
| SNTP SERVER | | SNTP SERVER ADDRESS | SNTP SERVER ADDRESS |
| | | SNTP POLLING | SNTP SERVER ADDRESS POLLING (REGULAR INTERVALS) SNTP SERVER ADDRESS POLLING (STARTING TIME ONLY) |
| | | SNTP POLLING | SNTP SERVER ADDRESS POLLING INTERVALS (IN MIN.) |
| | | POSSIBLE REBOOT | REBOOT POSSIBILITY AFTER SETTING (READONLY) |
| TIME ZONE | | STANDARD OFFSET | OFFSET OF STANDARD TIME (DIFFERENCE WITH UTC IN MIN.) |
| | | STANDARD MONTH | START MONTH OF STANDARD TIME (THE MONTH AFTER DAY LIGHT SAVING TIME) |
| | | STANDARD DAY | START DAY OF STANDARD TIME (THE DAY AFTER DAY LIGHT SAVING TIME) ERROR EXCEPT FOR (LAST:-, NEXT:+) 1, 8, 22, -6 |
| | | STANDARD DAY OF WEEK | START DAY OF WEEK OF STANDARD TIME (THE DAY OF WEEK AFTER DAY LIGHT SAVING TIME) |
| | | STANDARD START TIME OF DAY | TIME FROM 0 O'CLOCK TO START OF STANDARD TIME (END OF DAY LIGHT SAVING TIME) |
| | | DAYLIGHT OFFSET | OFFSET OF DAY LIGHT SAVING TIME (DIFFERENCE WITH UTC IN MINUTES) |
| | | DAYLIGHT MONTH | START MONTH OF DAY LIGHT SAVING TIME |
| | | DAYLIGHT DAY | START DAY OF DAY LIGHT SAVING TIME |
| | | DAYLIGHT DAY OF WEEK | START DAY OF WEEK OF DAY LIGHT SAVING TIME |
| | | DAYLIGHT START TIME OF DAY | TIME FROM 0 O'CLOCK TO START OF DAY LIGHT SAVING TIME |
| | | POSSIBLE REBOOT | REBOOT POSSIBILITY AFTER SETTING (READONLY) |

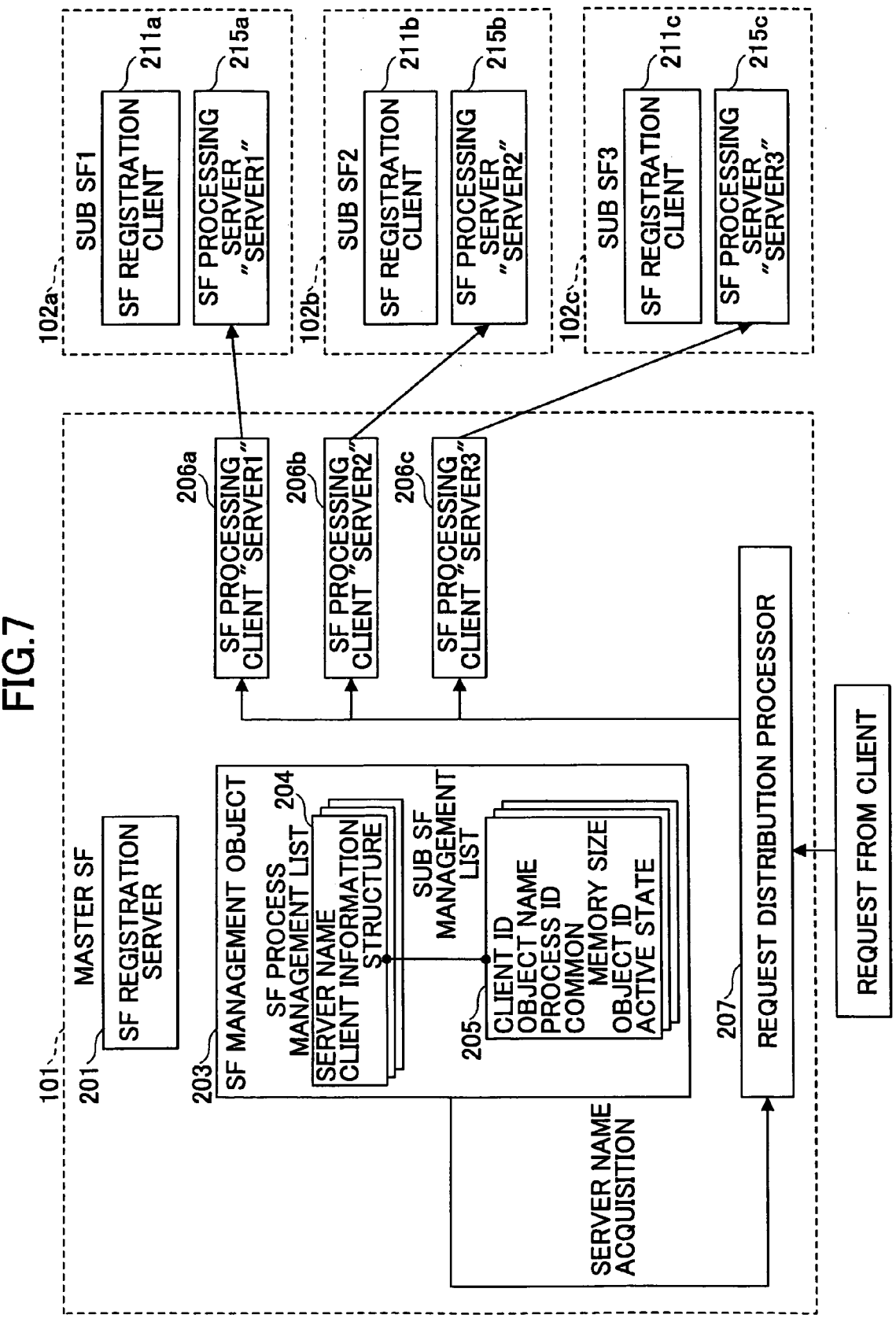

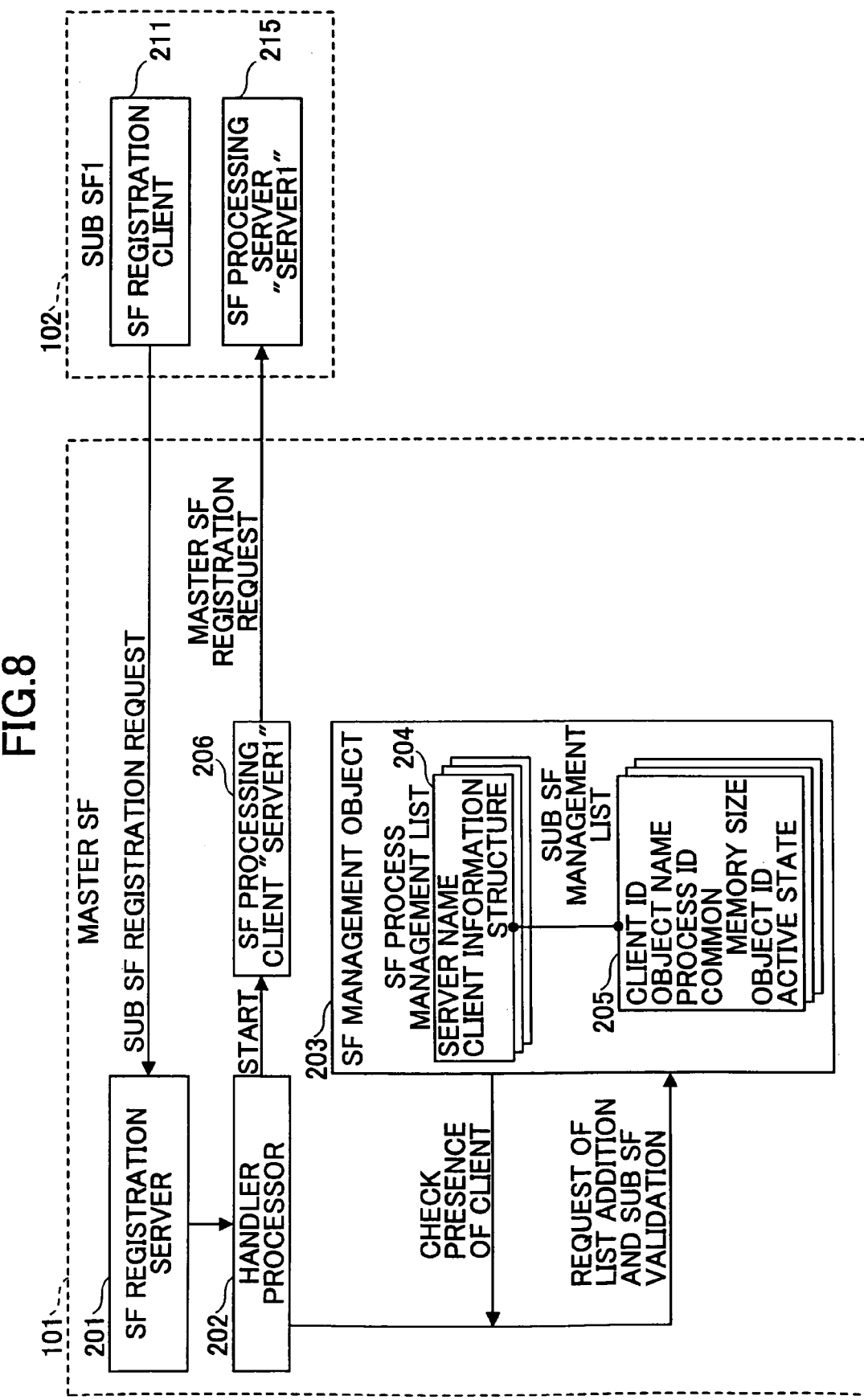

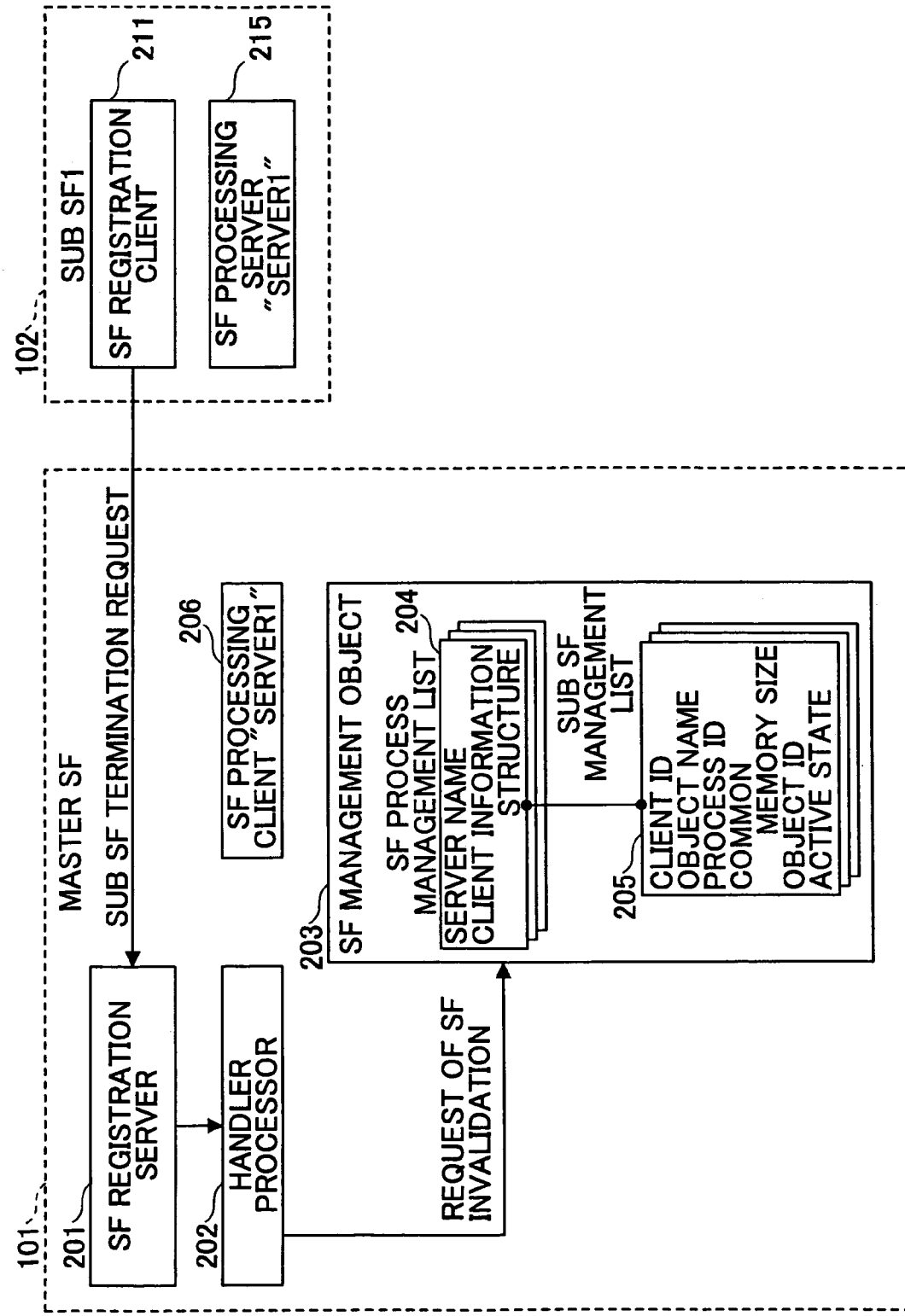

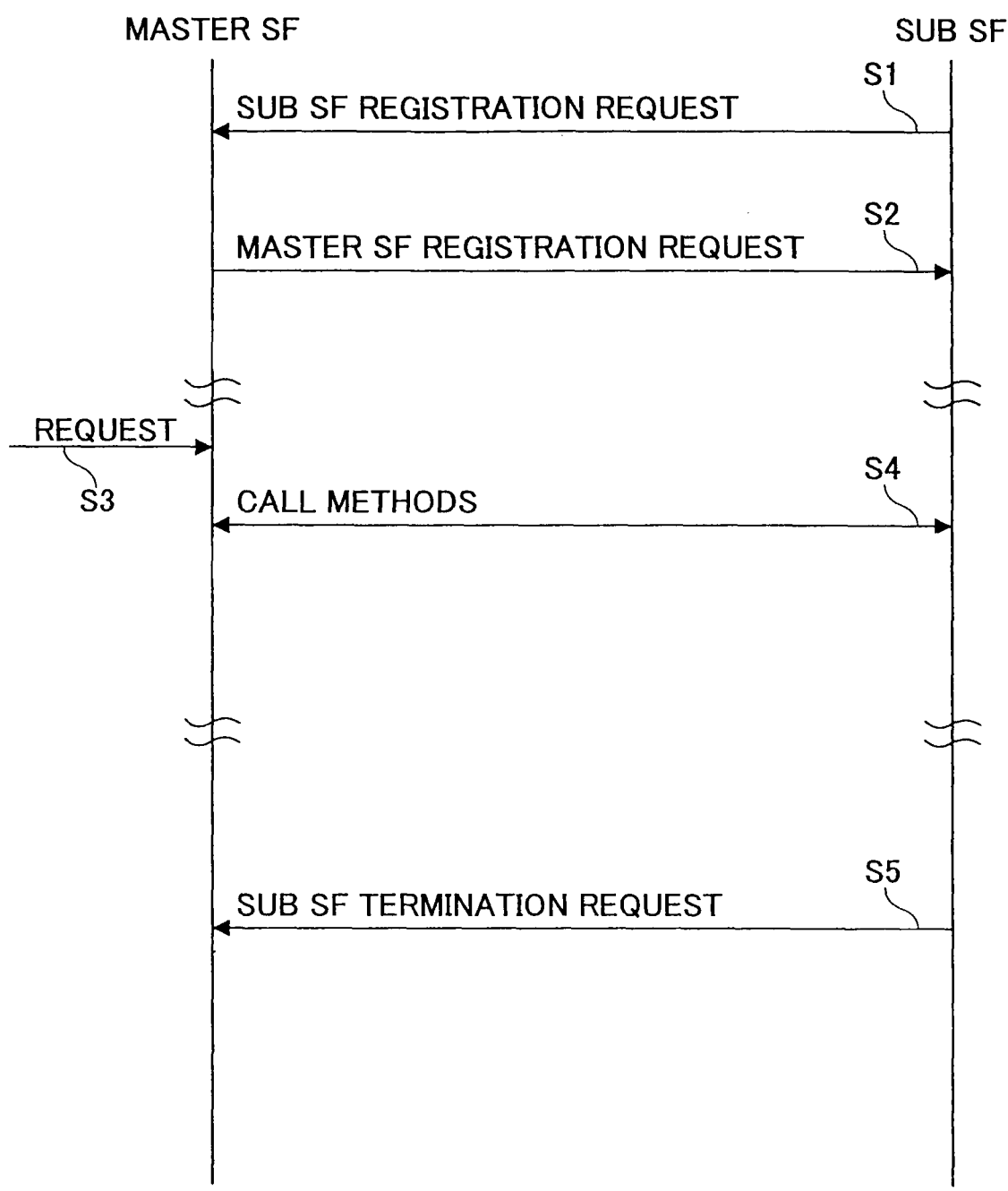

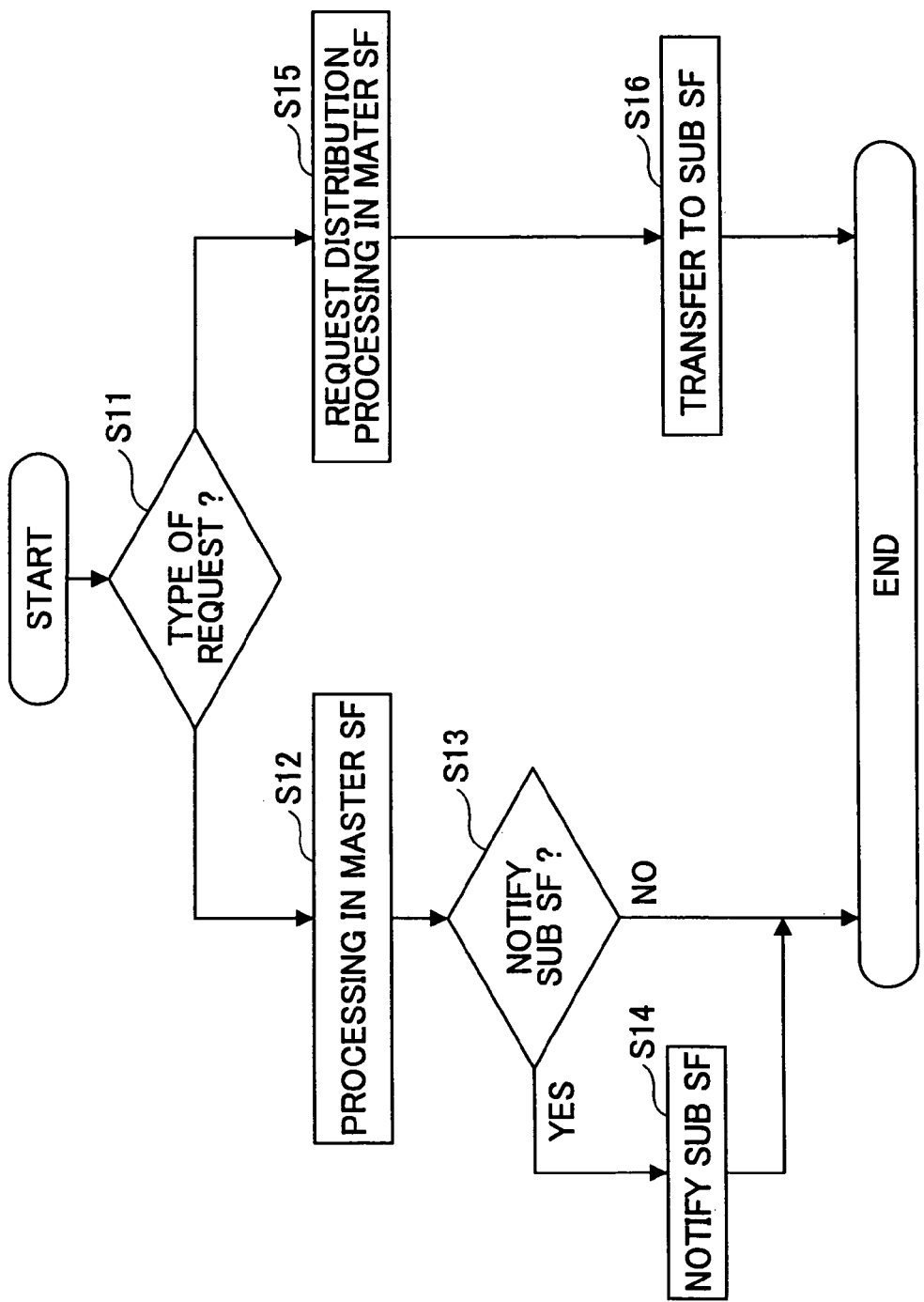

FIG.12

| REQUEST | ITEM | ITEM TYPE | SUB SF |
|---|---|---|---|
| VERSION ACQUISITION | – | – | |
| SERVICE STATE ACQUISITION | – | – | |
| SESSION START | – | – | NOTIFICATION ONLY |
| SESSION END | – | – | NOTIFICATION ONLY |
| SESSION EXTENSION | – | – | |
| DEVICE OCCUPATION START | – | – | NOTIFICATION ONLY |
| DEVICE OCCUPATION END | – | – | NOTIFICATION ONLY |
| ITEM TYPE LIST ACQUISITION | – | – | |
| ITEM CAPABILITY ACQUISITION | YES | – | |
| ITEM SETTINGS ACQUISITION | YES | – | |
| ITEM LIST ACQUISITION | – | YES | |
| ITEM SETTING MODIFICATION | YES | – | |

FIG.13

MULTIPLE FUNCTION IMAGE FORMATION DEVICE AND METHOD INCLUDING MASTER AND SUB-SERVICE FUNCTIONS

BACKGROUND OF THE INVENTION

1. Field of the Invention

The present invention relates to an image formation device, in particular, to a multiple function image formation device including a service function unit for processing a request for a service function of the image formation device, and a method of the image formation device.

2. Description of the Related Art

In recent and continuing years, multiple function image formation devices become more and more well known. A multiple function image formation device includes functions of a printer, a copier, a facsimile, a scanner, and others in the same frame. For example, a plotter and a scanning device are actually installed in the multiple function image formation device, and software realizing functions of a printer, a copier, a facsimile, and a scanner are installed in the software system of the device; by switching the software related to each of these functions, the image formation device can be driven to work as a printer, a copier, a facsimile, a scanner, or others.

For example, Japanese Laid-Open Patent Application No. 2003-341175 discloses a technique in this field.

Because the multiple function image formation device has functions of a printer, a copier, a facsimile, a scanner, and so on, the system of the device needs to manage a large number of functional items. For this reason, in the system of the multiple function image formation device, service functions (below, abbreviated as "SF" where necessary) are prepared corresponding to these functional items to manage these functional items.

However, the functional items required in the multiple function image formation device depend on the configuration of components in the multiple function image formation device. In order that the service functions can support all possible configurations of the image formation device, in the related art, the service functions are built to manage all kinds of functional items possibly required in the multiple function image formation device. For example, even in an image formation device without the function of a facsimile, it is necessary to prepare the service functions to be able to manage functional items required by the facsimile as long as the facsimile function is probably going to be added to the device in the future.

SUMMARY OF THE INVENTION

It is a general object of the present invention to solve one or more problems of the related art.

A specific object of the present invention is to provide an image formation device including service functions corresponding to a configuration of the image formation device, and a method of the image formation device.

According to a first aspect of the present invention, there is provided an image formation device, including: a service function unit for processing a request for a service function, the service function unit including a master service function section and plural sub service function sections, wherein one of the sub service function sections assuming an operating state requests the master service function section to register the one of the sub service function sections; the master service function section assigns the service function request to the one of the sub service function sections according to the type of the service function request; and the one of the sub service function sections processes the service function request assigned by the master service function section.

According to a second aspect of the present invention, there is provided a method of an image formation device, the image formation device including a service function unit for processing a request for a service function, the service function unit including a master service function section and plural sub service function sections, the method comprising the steps of: requesting, by one of the sub service function sections assuming an operating state, the master service function section to register the one of the sub service function sections; assigning, by the master service function section, the service function request to the one of the sub service function sections according to the type of the service function request; and processing, by the one of the sub service function sections, the service function request assigned by the master service function section.

According to a third aspect of the present invention, there is provided a program for executing an image formation device, the image formation device including a service function unit for processing a request for a service function, the service function unit including a master service function section and plural sub service function sections, the program controlling the image formation device to execute the steps of: directing one of the sub service function sections assuming an operating state to request the master service function section to register the one of the sub service function sections; directing the master service function section to assign the service function request to the one of the sub service function sections according to the type of the service function request; and directing the one of the sub service function sections to process the service function request assigned by the master service function section.

According to the present invention, because the service function unit for processing a request for a service function includes a master service function section and plural of sub service function sections, and one of the sub service function sections assuming an operating state can be registered in the master service function section, it is possible to provide an image formation device able to configure service functions in correspondence to the configuration of the image formation device, and in the image formation device, the master service function section is allowed to assign the service function request to the sub service function section according to the type of the service function request, and the sub service function section processes the service function request assigned by the master service function section.

These and other objects, features, and advantages of the present invention will become more apparent from the following detailed description of preferred embodiments given with reference to the accompanying drawings.

BRIEF DESCRIPTION OF THE DRAWINGS

FIG. 5 is a table showing an example of details of the management items;

FIG. 7 is a block diagram exemplifying a configuration including one master service function 101 and three sub service functions 102a, 102b, 102c;

FIG. 8 is a block diagram exemplifying handler processing for an event of sub service function registration request;

FIG. 9 is a block diagram exemplifying handler processing for an event of sub service function termination request;

FIG. 10 is a diagram exemplifying the sequence of the messages between the master service function 101 and the sub service function 102;

FIG. 11 is a flowchart illustrating an example of the request distribution processing performed by the request distribution processor 207;

FIG. 12 is a table showing a list of requests for the device management services;

FIG. 13 is a diagram exemplifying an object ID;

DESCRIPTION OF THE PREFERRED EMBODIMENTS

Below, preferred embodiments of the present invention are explained with reference to the accompanying drawings.

In the following descriptions of the embodiments, a multiple function image formation device is taken as an example of the image formation device of the present invention, which incorporates functions of a printer, a copier, a facsimile, a scanner, and others into the same frame. Certainly, the image formation device of the present invention can include other kinds of image formation units. In addition, in the following descriptions of the embodiments, the service function for device management is taken as an example. But the present invention is applicable to other kinds of service functions.

Figure 1:
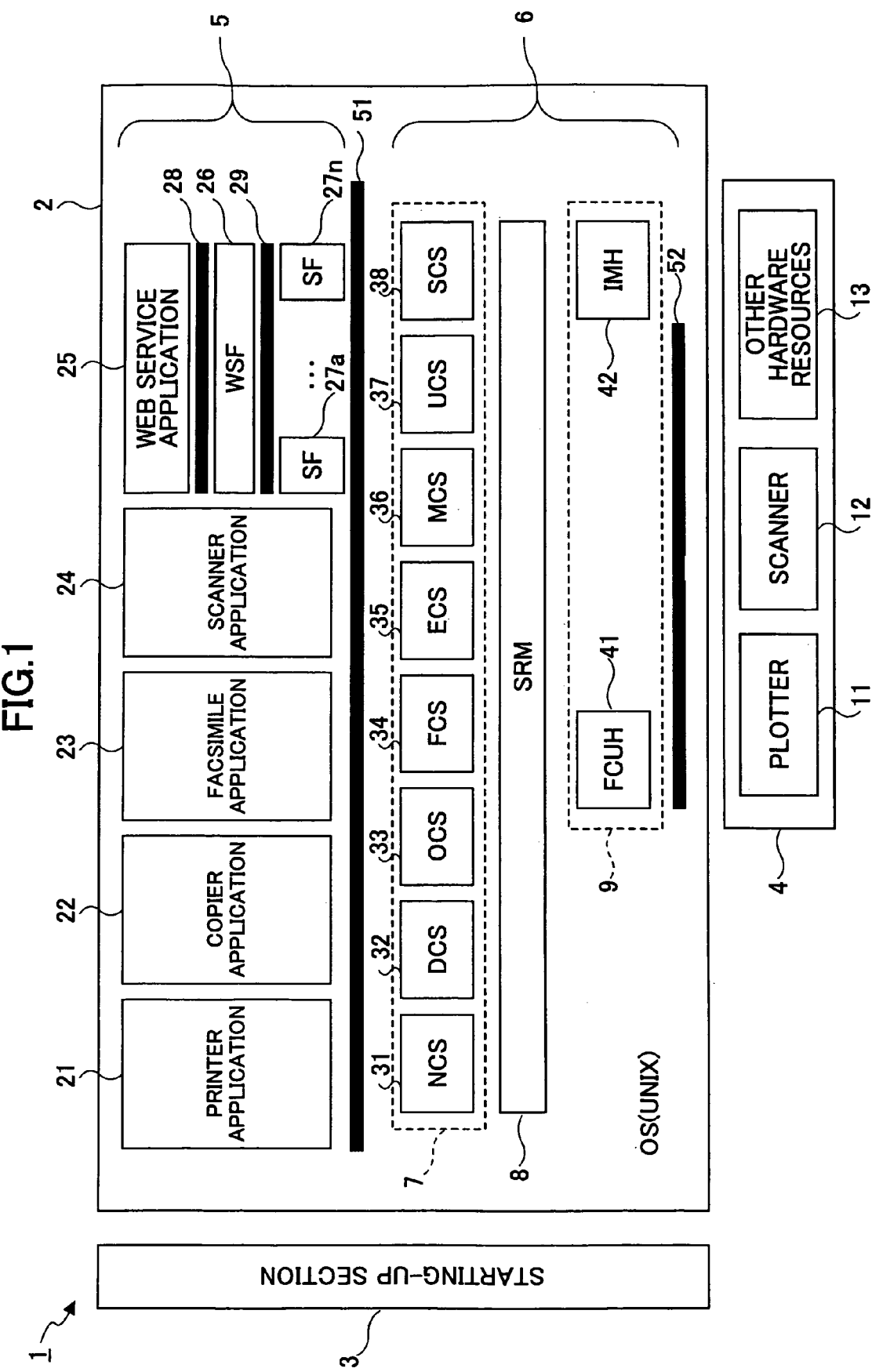
FIG. 1 is a block diagram illustrating an example of a configuration of a software system in a multiple function image formation device 1.

FIG. 1 is a block diagram illustrating an example of a configuration of a software system in a multiple function image formation device 1.

As illustrated in FIG. 1, the software system of the multiple function image formation device 1 includes a software package 2, a starting-up section 3, and hardware resources 4.

The hardware resources 4 include a plotter 11, a scanner 12, and other hardware resources 13 like a facsimile.

The software package 2 includes an application layer 5 started up under UNIX (a registered trademark) or other operating systems (below, abbreviated as "OS"), and platform 6.

For example, the application layer 5 include programs related to image formation with a printer, a copier, a facsimile, or a scanner, and programs related Web services. As illustrated in FIG. 1, the application layer 5 may include a printer application 21, a copier application 22, a facsimile application 23, a scanner application 24, a Web service application 25, a Web service function (below, abbreviated as "WSF" when necessary) 26, and service functions (SF) 27a through 27n. Below, reference number 27 is used to indicate any one of the service functions 27a through 27n.

The Web service function 26 includes an application program interface (below, abbreviated as "API" when necessary) 28, which enables reception of a request from the Web service application 25 by using a function defined in advance. Similarly, the service function 27 includes an application program interface (API) 29, which enables reception of a request from the Web service function 26 by using a function defined in advance.

When receiving a request from the Web service application 25, the Web service function 26 transforms the request into a request to the service function 27. In response to the request, the Web service function 26 selects one of the service functions 27, and transmits the request to the selected service function 27 via API 29. When receiving the request, the selected service function 27 performs processing as requested.

The platform 6 include a control service layer 7 that interprets the request from the application layer 5 and generates a request for acquiring the hardware resources 4, a system resource manager (SRM) 8 that manages the hardware resources 4 and arbitrates the acquisition request from the control service layer 7, and a handler layer 9 that manages the hardware resources 4 according to the acquisition request.

The control service layer 7 includes plural service modules such as NCS 31, DCS 32, OCS 33, FCS 34, ECS 35, MCS 36, UCS 37, SCS 38.

The platform 6 includes an application program interface (API) 51, which receives a request from the application layer 5 by using a function defined in advance. The OS executes programs in the application layer 5 and the platform 6 in parallel as processes.

The process of the NCS (network control service) 31 intermediates distribution of data received from the network through protocols to the applications 5, alternatively, intermediates transmission of data from the applications 5 to the network.

The process of the DCS (delivery control service) 32 controls delivery of document data stored in the multiple function image formation device 1.

The process of the OCS (operational panel control service) 33 controls an operational panel as described below.

The process of the FCS (facsimile control service) 34 provides an API for transmitting a facsimile to and receiving a facsimile from the application layer 5 by utilizing a PSTN or ISDN network, registering or citing various facsimile data stored in a backup memory, reading a facsimile, and printing a received facsimile.

The process of the ECS (engine control service) 35 controls engines of the plotter 11, the scanner 12, and other hardware resources 13.

The process of the MCS (memory control service) 36 controls allocation and release of a memory, utilization of a hard disk (HDD), compression and decompression of image data, and others.

The process of the UCS (user information control service) 37 manages user information.

The process of the SCS (system control service) 38 performs control of an operational unit, system information display, LED indication, management of the hardware resources 4, application management, and control of interruption applications.

The process of the SRM 8 performs system control and management of the hardware resources 4 together with the SCS 38. For example, the process of the SRM 8 arbitrates an acquisition request from an upper layer for utilizing the hardware resources 4 such as the plotter 11 or the scanner 12, and controls execution of the hardware resources 4.

Specifically, the process of the SRM 8 determines whether the acquired hardware resources 4 as requested are available (in other words, whether the hardware resources 4 are being used for other acquisition requests); if the acquired hardware resources 4 are available, the process of the SRM 8 notifies the upper layer that the acquired hardware resources 4 as requested are available. In response to the acquisition request from the upper layer, the process of the SRM 8 performs scheduling in order to utilize the hardware resources 4, and processes the request directly (such as paper conveyance and image-formation by the printer engine, memory allocation, and file creation).

The handler layer 9 includes a facsimile control unit handler (FCUH) 41 that manages a facsimile control unit (FCU) as described below, and an image memory handler (IMH) 42 that manages allocation of the memory to processes and the memory allocated to processes.

By utilizing an engine interface (I/F) 52, which transmits a request to the hardware resources 4 by using a function defined in advance, the SRM 8 and the FCUH 41 makes a request to the hardware resources 4.

With the configuration illustrated in FIG. 1, the multiple function image formation device 1 is able to perform all processing commonly required by the applications 5 on the platform 6 in an integrated manner.

Next, a description is made of a hardware configuration of the multiple function image formation device 1.

Figure 2:
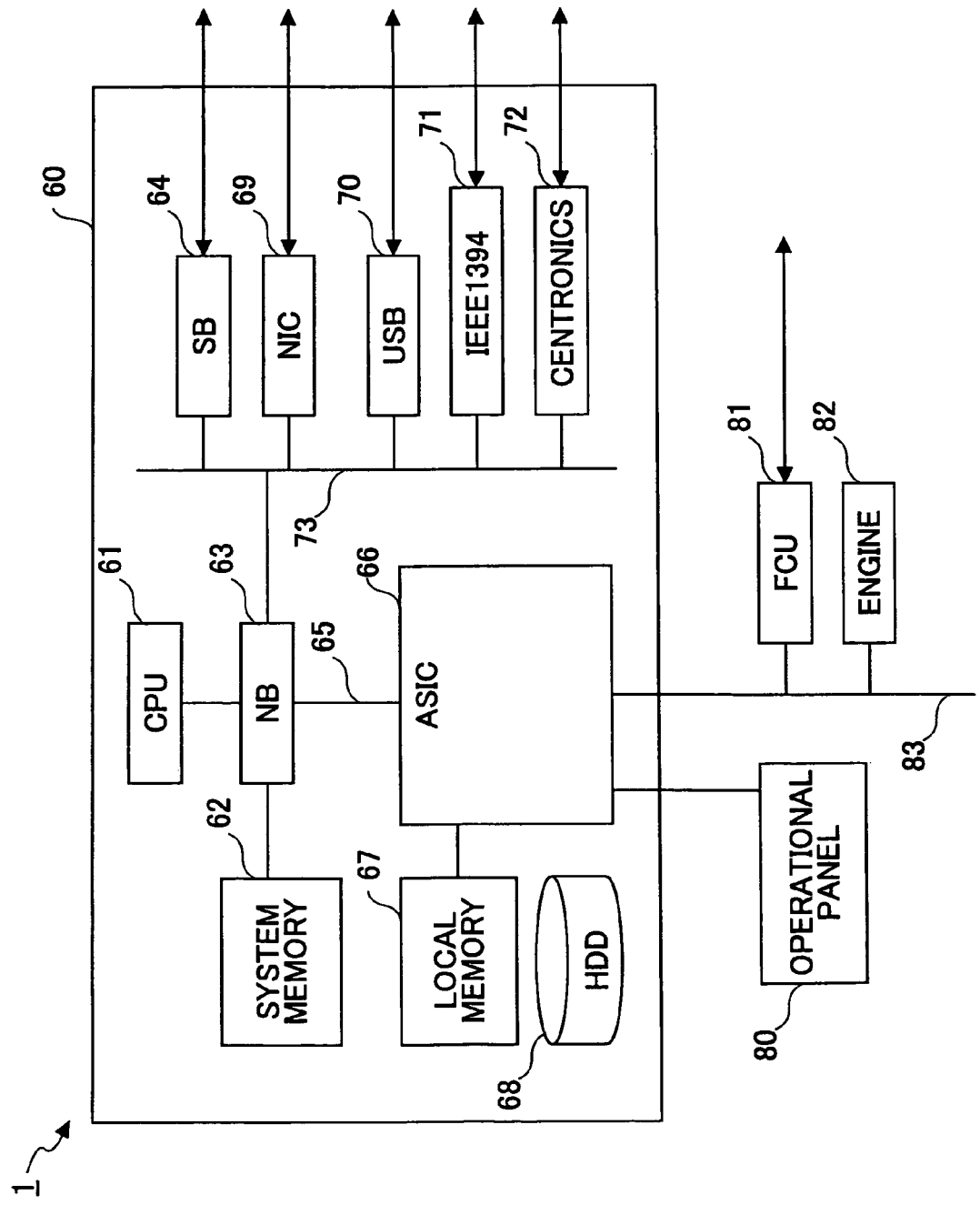
FIG. 2 is a block diagram illustrating an example of a hardware configuration of the multiple function image formation device 1.

FIG. 2 is a block diagram illustrating an example of a hardware configuration of the multiple function image formation device 1.

As illustrated in FIG. 2, the multiple function image formation device 1 includes a controller 60, an operational panel 80, an FCU 81, and an engine 82.

The controller 60 includes a CPU 61, a system memory 62, a NB (north bridge) 63, a SB (south bridge) 64, an ASIC (Application Specific Integrated Circuit) 66, a local memory 67, a HDD 68, an NIC (Network Information Card) 69, a USB I/F 70, an IEEE 1394 I/F 71, and a Centronics I/F 72.

The operational panel 80 is connected to the ASIC 66 of the controller 60. The FCU 81 and the engine 82 are connected to the ASIC 66 of the controller 60 through a PCI bus 83.

In the controller 60, the local memory 67 and the HDD 68 are connected to the ASIC 66, and the CPU 61 is connected to the ASIC 66 through the NB 63 of a CPU chipset. In addition, the ASIC 66 and the NB 63 are connected through an accelerated Graphics Port (AGP) 65.

The CPU 61 controls the overall operations of the multiple function image formation device 1. In FIG. 1, the CPU 61 initiates one or more service modules included in the control service layer 7; the SRM 8; and the FCUH 41 and the IMH 42, which constitute the handler layer 9. Further, the CPU 61 initiates and executes the printer application 21, the copier application 22, the facsimile application 23, the scanner application 24, the Web service application 25, the Web service function 26, and the service functions 27a through 27n, which constitute the application layer 5.

The NB 63 is a bridge for connecting the CPU 61, the system memory 62, the SB 64, the ASIC 66, the NIC 69, the USB I/F 70, the IEEE 1394 I/F 71, and the centronics I/F 72. The NB 63 is connected to the SB 64, the NIC 69, the USB I/F 70, the IEEE394 I/F 71, and the Centronics I/F 72 through the PCI bus 73.

The SB 64 is a bridge for connecting the PCI bus 73 to a ROM or peripheral devices.

The system memory 62 is used as a write memory or others. The local memory 67 is used as an image buffer for copy, or a code buffer.

The ASIC 66 is an IC (Integrated Circuit) specifically used for image processing, which includes hardware elements capable of image processing.

The HDD 68 is an example of a storage device for storing image data, document data, programs, font data, forms, and others.

The NIC 69 is an interface device for connecting the multiple function image formation device 1 to a network such as the Internet or a LAN (Local Area Network).

The USB I/F 70, the IEEE 1394 I/F 71, and the Centronics I/F 72 are interfaces in compliance with various standards.

The operational panel 80 is for a user to input operations or for displaying information to the user. The FCU 81 has a backup memory, for example, the backup memory is used for temporarily storing received facsimile data when the multiple function image formation device 1 is turned off.

Figure 3:
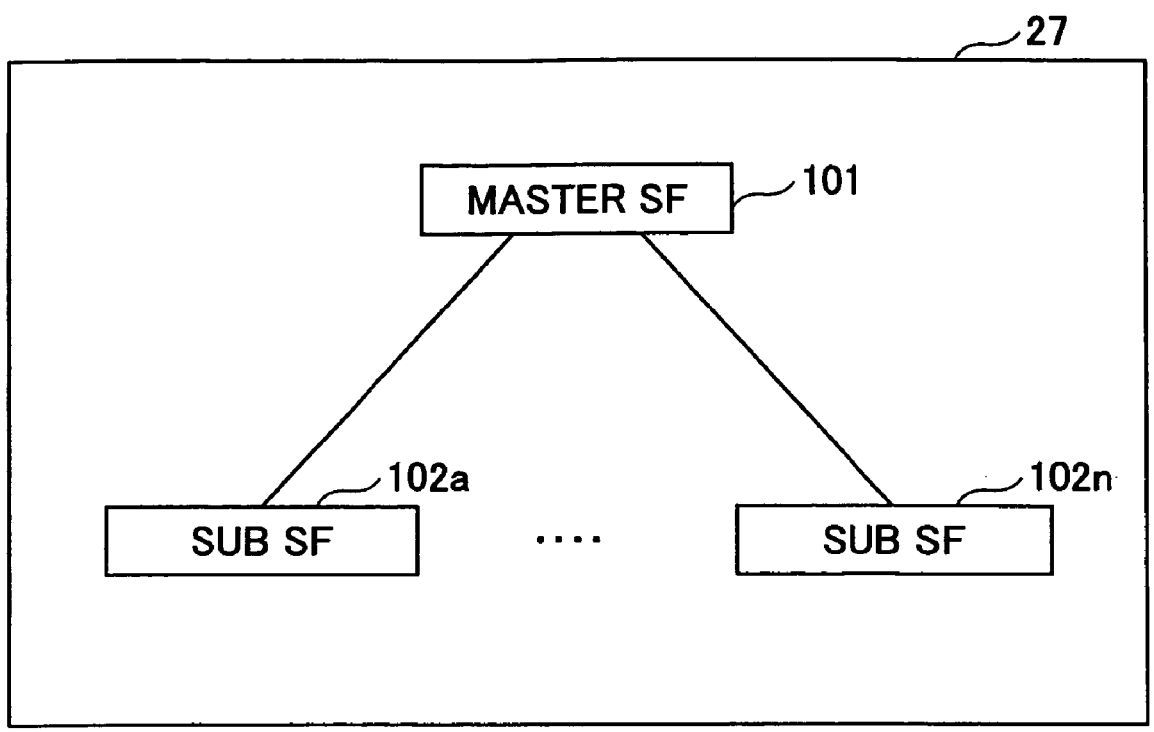
FIG. 3 is a block diagram exemplifying the service function (SF) 27.

FIG. 3 is a block diagram exemplifying the service function (SF) 27.

As illustrated in FIG. 3, the service function 27 includes a master service function 101, and one or more sub service functions 102a through 102n. Below, reference number 102 is used to indicate any one of the sub service functions 102a through 102n. In the following description, assume the service function 27 is for device management services.

The master service function 101 receives requests of the device management service. The requests received by the master service function 101 include requests with a specified management item or a specified management item type. The master service function 101 is configured to manage a complete list of the item type, and the corresponding relations between the item type and the sub service function 102.

The master service function 101 assigns the received request to one of the sub service functions 102a through 102n corresponding to the management item or the management item type. When the request received by the master service function 101 is for all the device management services, the master service function 101 may execute in accordance with the request.

When receiving the request from the master service function 101, the sub service function 102 executes in accordance with the request. Namely, the sub service function 102 executes to provide the device management service.

Figure 4:
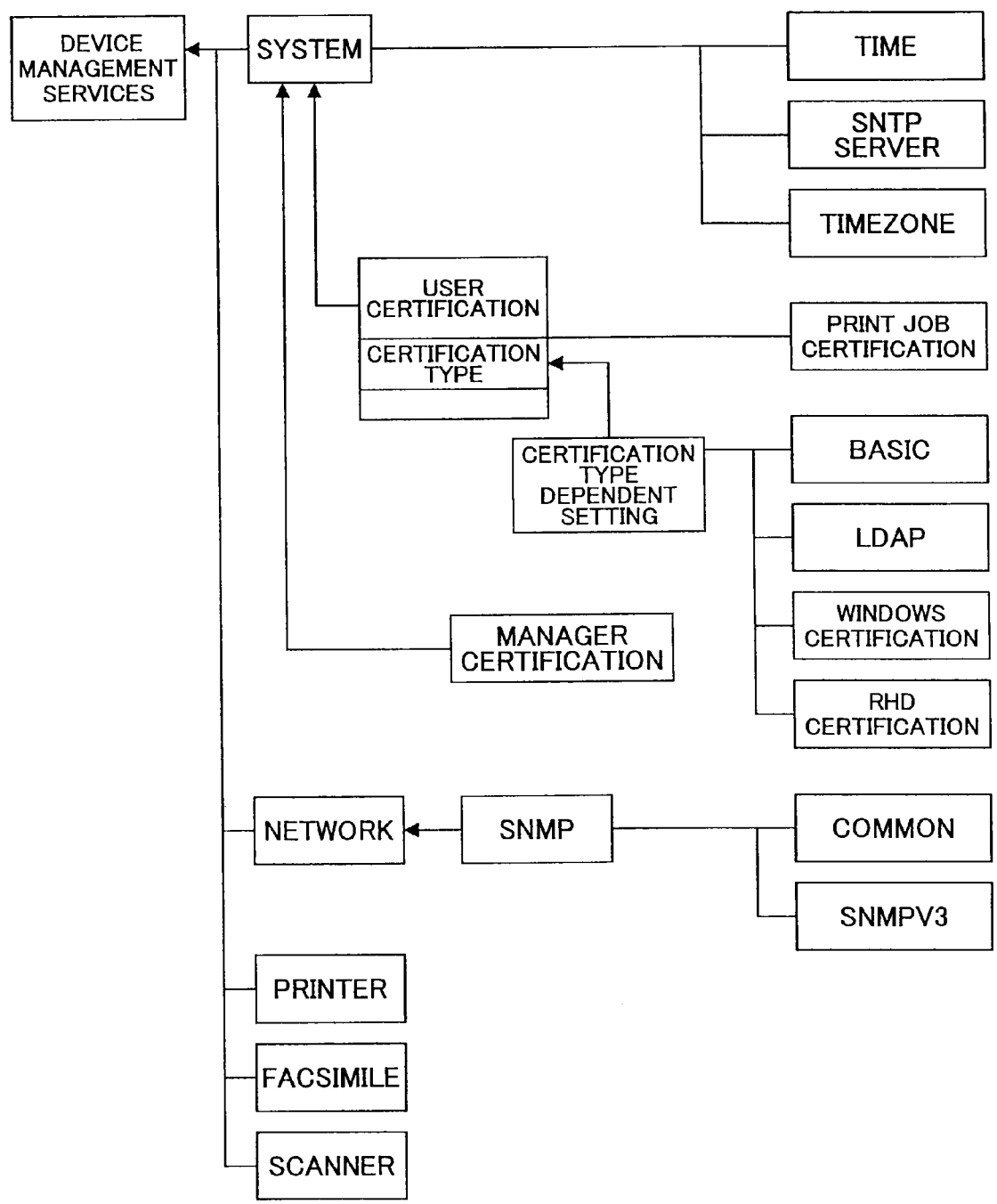
FIG. 4 is a block diagram exemplifying the correspondence relations between the management item type and the management item.

FIG. 4 is a block diagram exemplifying the correspondence relations between the management item type and the management item.

As illustrated in FIG. 4, for example, there are management item types of "system", "network", "printer", "facsimile", and "scanner", and there are management items of "time", "sntpServer", and "timezone", and so on.

That is to say, in the service function 27 for the device management service, the management items are classified into different item types, and a sub service function 102 is provided for each of the item types.

FIG. 5 is a table showing an example of details of the management items.

In FIG. 5, a column "class" represents the management items, and a column "name" shows the contents of the management items.

Below, the master service function 101 and the sub service function 102 shown in FIG. 3 are described in detail with reference to FIG. 6.

Figure 6:
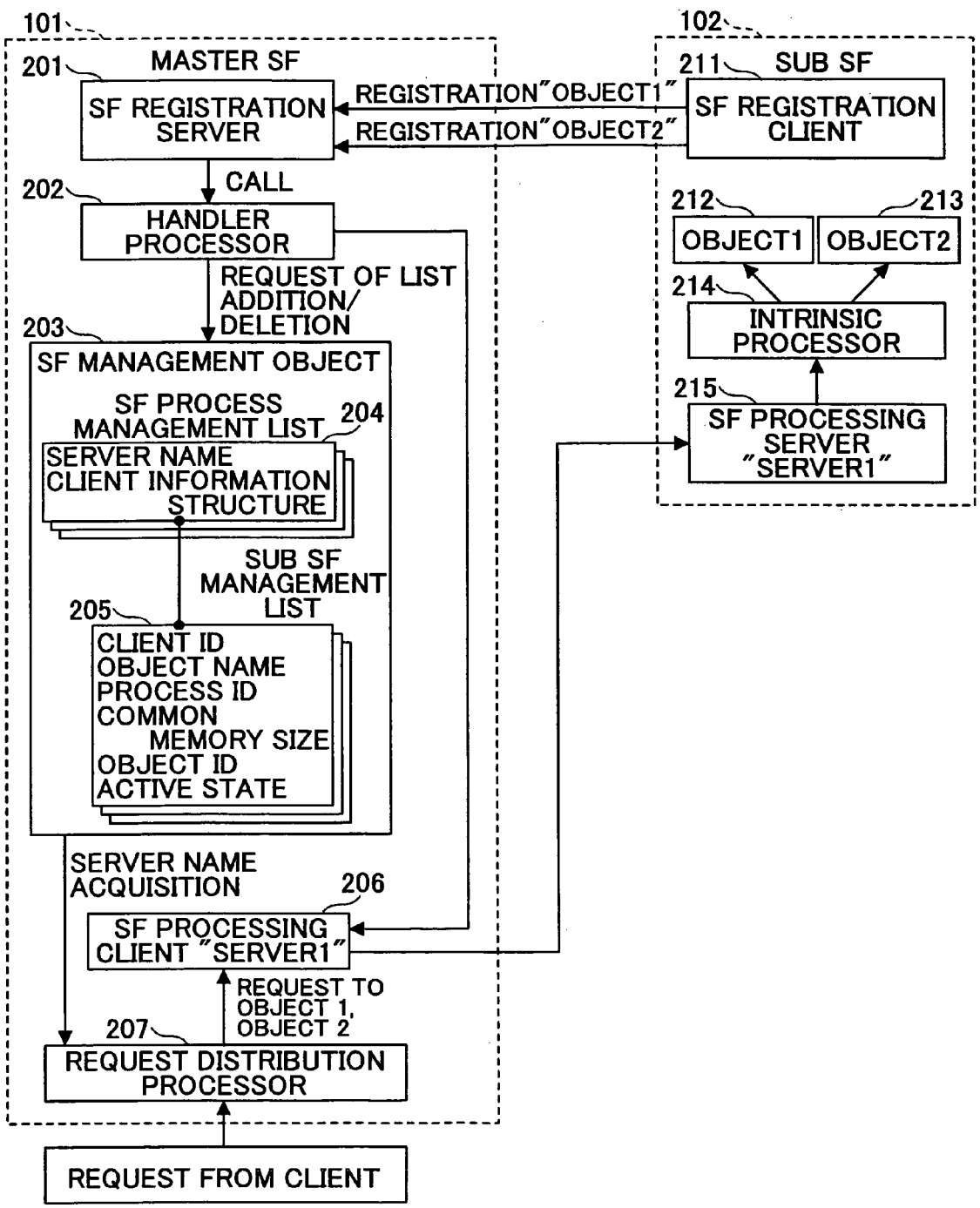
FIG. 6 is a block diagram exemplifying configurations of the master service function 101 and the sub service function 102.

FIG. 6 is a block diagram exemplifying configurations of the master service function 101 and the sub service function 102.

As illustrated in FIG. 6, the master service function 101 includes a service function (SF) registration server 201, a handler processor 202, a service function (SF) management object 203, a service function (SF) processing client 206, and a request distribution processor 207.

The service function management object 203 includes a service function (SF) process management list 204, and a sub service function (SF) management list 205.

The sub service function 102 includes a service function (SF) registration client 211, objects 212, 213, an intrinsic processor 214, and a service function (SF) processing server 215.

The master service function 101 and the sub service function 102 perform interactive control through inter-process communications. In the inter-process communications between the master service function 101 and the sub service function 102, there are a communication for registration and a communication for processing. The communication for registration is performed between the service function registration client 211 of the sub service function 102 and the service function registration server 201 of the master service function 101. The communication for processing is performed between the service function (SF) processing client 206 of the master service function 101 and the service function (SF) processing server 215 of the sub service function 102.

The sub service function 102 can mount plural objects 212, 213. For example, during the communication for registration, the service function registration client 211 of a sub service function 102 assuming the operating state transmits a number of requests for registration the same as the number of the supported objects 212, 213 to the service function registration server 201 of the master service function 101.

With the handler processor 202, which is called out from a library of the service function registration server 201, the service function registration server 201 of the master service function 101 registers information of the sub service function 102, which receives the registration request in the service function management object 203.

Specifically, the handler processor 202 registers a server name and client information structure in the service function process management list 204, and registers a client ID, an object name, a process ID, a common memory size, an object ID, and an active state in the sub service function management list 205 associated with the service function process management list 204.

For example, in FIG. 6, when the sub service function 102 transmits the registration request, the handler processor 202 registers a server name "Server1" and a client information structure in the service function process management list 204, and registers a client ID, an object name "Obejct1", "Obejct2", a process ID of the sub service function 102, a common memory size used by the communication for processing, the object IDs of the objects 212, 213, and an active state (valid or invalid) in the sub service function management list 205 associated with the service function process management list 204.

In order to enable the communication for processing, the sub service function 102 starts the service function processing client 206 to register the service function processing client 206 as a client for inter-process communication with the service function processing server 215 of the sub service function 102.

On the other hand, the request distribution processor 207 receives the request for device management service from clients such as the Web service application 25 or others through the Web service function 26. The request distribution processor 207 checks the service function management object 203 with the object ID and an object class as key information, and obtains the server name of the service function processing client 206. For example, the request distribution processor 207 obtains the server name of the service function processing client 206 capable of inter-process communication with the sub service function 102 corresponding to the request.

Through the inter-process communications between the service function processing client 206 specified with the obtained server name and the service function processing server 215 of the sub service function 102, the request distribution processor 207 transmits the request from the client to the service function processing server 215.

The service function processing server 215 transmits the request to the intrinsic processor 214. The intrinsic processor 214 directs the objects 212, 213 to perform processing in accordance with the request.

FIG. 7 is a block diagram exemplifying a configuration including one master service function 101 and three sub service functions 102a, 102b, 102c.

In FIG. 7, the master service function 101 includes service function processing clients 206a, 206b, 206c in correspondence to the sub service functions 102a, 102b, 102c, respectively, so that the master service function 101 is able to communicate with the sub service functions 102a, 102b, 102c through the inter-process communications.

The service function processing client 206a is registered as a client for inter-process communication with the service function processing server 215a of the sub service function 102a. Similarly, the service function processing client 206b is registered as a client for inter-process communication with the service function processing server 215b of the sub service function 102b, and the service function processing client 206c is registered as a client for inter-process communication with the service function processing server 215c of the sub service function 102c.

The request distribution processor 207 receives the request for device management service from clients through the Web service function 26. The request distribution processor 207 checks the service function management object 203 with the object ID and an object class as key information, and obtains the server name of one of the service function processing clients 206a, 206b, and 206c. For example, the request distribution processor 207 obtains the server name of one of the service function processing clients 206a, 206b, and 206c capable of inter-process communications with the sub service functions 102a, 102b, 102c corresponding to the request.

Through the inter-process communications between one of the service function processing clients 206a, 206b, and 206c specified with the obtained server name and one of the service function processing servers 215a, 215b, 215c, the request distribution processor 207 transmits the request from the client to one of the service function processing servers 215a, 215b, 215c.

The one of the service function processing servers 215a, 215b, 215c transmits the request to the intrinsic processor 214, and the intrinsic processor 214 directs the objects 212, 213 to perform processing in accordance with the request.

FIG. 8 is a block diagram exemplifying handler processing for an event of sub service function registration request.

In the master service function 101, the event of the sub service function registration request to the service function registration server 201 is processed by the following handler processing.

First, the handler processor 202 locks the service function management object 203, that is, only the handler processor 202 is allowed to check the service function management object 203 and update the service function management object 203. The handler processor 202 checks the service function management object 203 to confirm whether the service function processing client 206 of the relevant object is present in the service function process management list 204 of the service function management object 203.

If the service function processing client 206 of the relevant object is present in the service function process management list 204 of the service function management object 203, and if the service function processing client 206 is not started up yet, the handler processor 202 initializes and starts up the service function processing client 206. When initialization of the service function processing client 206 is successful, the handler processor 202 requests the service function management object 203 to add the service function process management list 204 and sub service function management list 205 and validate the object of the sub service function 102.

Next, the handler processor 202 requests the service function processing client 206 to make a master service function registration request to the service function processing server 215 of the sub service function 102. The service function registration request is made only at the time of the first registration of the service function processing client 206. For example, when a sub service function registration request is transmitted to request re-start of an already-registered sub service function 102 after being terminated, it is confirmed that the master service function registration request is not a repeat. Then, the handler processor 202 unlocks the service function management object 203.

FIG. 9 is a block diagram exemplifying handler processing for an event of sub service function termination request.

In the master service function 101, the event of the sub service function termination request to the service function registration server 201 is processed by the following handler processing.

First, the handler processor 202 locks the service function management object 203. The handler processor 202 requests the service function management object 203 to invalidate the object of the sub service function 102. But the service function processing client 206 is not terminated. Then, the handler processor 202 unlocks the service function management object 203.

FIG. 10 is a diagram exemplifying the sequence of the messages between the master service function 101 and the sub service function 102.

In step S1, the service function registration client 211 of the sub service function 102 transmits the message of the sub service function registration request to the service function registration server 201 of the master service function 101. After receiving the message of the sub service function registration request, the master service function 101 performs a series of sub service function registration request processing.

In step S2, the service function processing client 206 of the master service function 101 transmits a message of the master service function registration request to the service function processing server 215 of the sub service function 102.

After the service function registration client 211 of the sub service function 102 transmits the message of the sub service function registration request, the client of the service function registration server 201 of the master service function 101 may be stopped temporarily. In this case, the service function registration client 211 is initialized and started up before transmitting the message of the sub service function termination request in step S5 described below.

When the process ID and the object name of the restarted service function registration client 211 of the sub service function 102 are the same, the master service function 101 regards the service function registration client 211 of the sub service function 102 as the same client, and controls the service function management object 203.

In step S3, the request distribution processor 207 of the master service function 101 receives the request.

In step S4, in correspondence to the request, the request distribution processor 207 of the master service function 101 calls out relevant methods through the inter-process communication between the master service function 101 and the sub service function 102.

In step S5, the service function registration client 211 of the sub service function 102 transmits the message of the sub service function termination request to the service function registration server 201 of the master service function 101. After receiving the message of the sub service function termination request, the master service function 101 performs a series of sub service function termination processing.

FIG. 11 is a flowchart illustrating an example of the request distribution processing performed by the request distribution processor 207.

As shown in FIG. 11, the request distribution processor 207 receives one of the requests as shown in FIG. 12 for the device management services from clients through the Web service function 26.

FIG. 12 is a table showing a list of requests for the device management services.

The requests for the device management service include requests for all of the device management services such as a version acquisition request, a service state acquisition request, a session starting request, a session extension request, a device occupation starting request, a device occupation ending request, a management item type list acquisition request, requests with specified management item types such as a management item list acquisition request, requests with specified management items such as a management item capability (range for selection or initial values) acquisition request, a management item settings acquisition request, a management item list acquisition request, and a management item setting modification request.

The requests for the device management service include requests used to notify the sub service function 102 after being processed in the master service function 101, such as a session starting request, a session ending request, a device occupation starting request, and a device occupation ending request.

After receiving the request as shown in FIG. 12, the request distribution processor 207 starts the request distribution processing as shown in FIG. 11.

In step S11, the request distribution processor 207 determines the type of the received request. When it is determined that the request received by the master service function 101 is for all the device management services, the request distribution processor 207 proceeds to step S12, and the master service function 101 processes the received request from the client. Then, the request distribution processor 207 proceeds to step S13, and after the processing in the master service function 101 is finished, the request distribution processor 207 determines whether it is necessary to notify the sub service function 102 of the request.

When it is determined that it is necessary to notify the sub service function 102 of the request, the request distribution processor 207 proceeds to step S14. In step S14, through the inter-process communications between the service function processing client 206 and the service function processing server 215, the request distribution processor 207 notifies the sub service function 102 of the request, which is processed in the master service function 101.

When it is determined that it is not necessary to notify the sub service function 102 of the request, the request distribution processor 207 ends the routine.

When in step S11 it is determined that the request is specified with a certain management item or a certain management item type, the request distribution processor 207 proceeds to step S15, for example, the request distribution processor 207 performs request distribution processing, specifically, the request distribution processor 207 determines the sub service function 102 according to the object ID or the object class.

Then, in step S16, the request distribution processor 207 transfers the request to the determined sub service function 102, and the finishes the routine.

Next, a description is made of the request distribution processing in step S15.

For example, with the configuration shown in FIG. 6, the request distribution processor 207 checks the service function management object 203 with the object ID included in the request from the client as key information.

The service function management object 203 searches the sub service function management list 205 with the object ID as key information, and obtains the server name of the service function processing client 206 from the service function process management list 204 associated with the sub service function management list 205 which is being searched. The service function management object 203 transmits the obtained server name to the request distribution processor 207.

Obtaining the server name of the service function processing client 206 capable of inter-process communication with the sub service function 102 corresponding to the request, the request distribution processor 207 can determine the sub service function 102 to which the request is assigned.

FIG. 13 is a diagram exemplifying an object ID.

As shown in FIG. 13, the object ID included in the request from the client may be defined to include the process ID of the sub service function 102. Such an object ID enables the request distribution processing as illustrated in FIG. 14.

Figure 14:
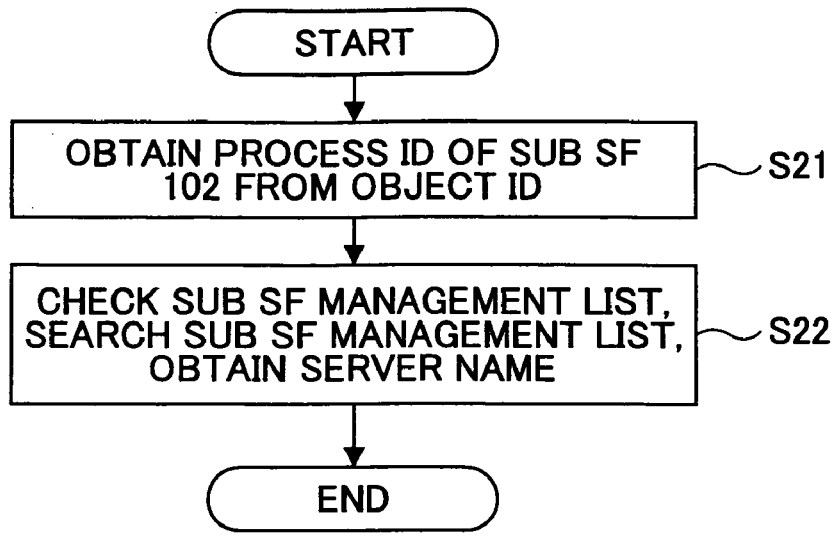
FIG. 14 is a flowchart illustrating an example of the request distribution processing.

FIG. 14 is a flowchart illustrating an example of the request distribution processing.

In step S21, the request distribution processor 207 obtains the process ID of the sub service function 102 from the object ID included in the request from the client.

In step S22, the request distribution processor 207 checks the service function management object 203 with the process ID of the sub service function 102 as key information.

The service function management object 203 searches the sub service function management list 205 with the process ID of the sub service function 102 as key information, and obtains the server name of the service function processing client 206 from the service function process management list 204 associated with the sub service function management list 205 which is being searched. The service function management object 203 transmits the obtained server name to the request distribution processor 207.

Obtaining the server name of the service function processing client 206 capable of inter-process communication with the sub service function 102 corresponding to the request, the request distribution processor 207 can determine the sub service function 102 to which the request is assigned.

In addition, as shown in FIG. 13, the object ID included in the request from the client may be defined to include the management item type ID and the management item ID, and further include an object management table in which the management item type ID and the management item ID are set to be associated with the process ID of the sub service function 102. Such an object ID enables the request distribution processing as illustrated in FIG. 15.

Figure 15:
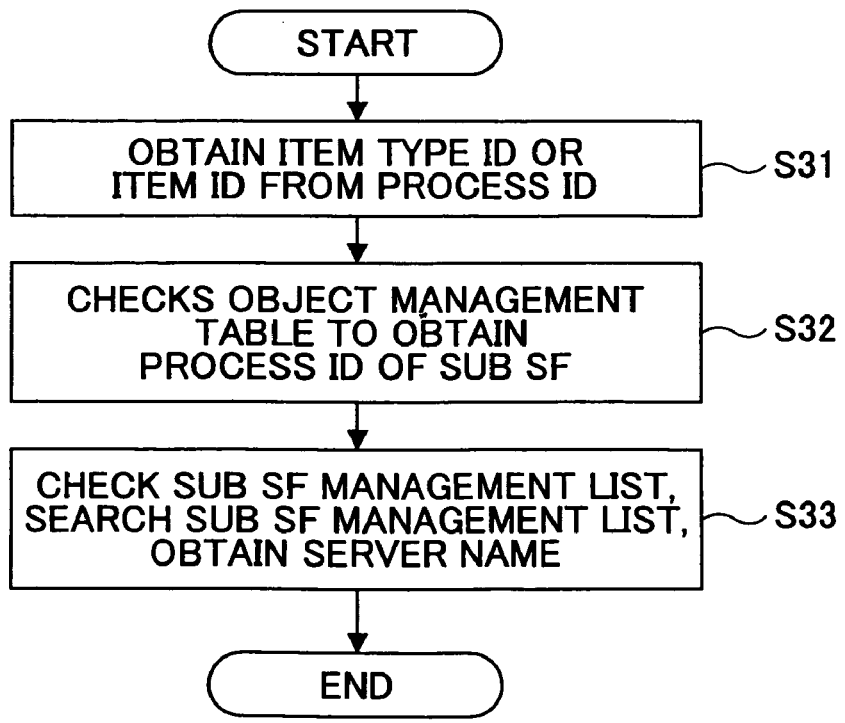
FIG. 15 is a flowchart illustrating another example of the request distribution processing.

FIG. 15 is a flowchart illustrating another example of the request distribution processing.

In step S31, the request distribution processor 207 obtains the management item type ID and the management item ID included in the request from the client.

In step S32, the request distribution processor 207 checks the object management table and obtains the process ID of the sub service function 102 associated with the management item type ID and the management item ID.

In step S33, the request distribution processor 207 checks the service function management object 203 with the process ID of the sub service function 102 as key information.

The service function management object 203 searches the sub service function management list 205 with the process ID of the sub service function 102 as key information, and obtains the server name of the service function processing client 206 from the service function process management list 204 associated with the sub service function management list 205 which is being searched. The service function management object 203 transmits the obtained server name to the request distribution processor 207.

Obtaining the server name of the service function processing client 206 capable of inter-process communication with the sub service function 102 corresponding to the request, the request distribution processor 207 can determine the sub service function 102 to which the request is assigned.

In addition, as shown in FIG. 13, the object ID included in the request from the client may be defined to include the management item type ID and the management item ID, and include an item type management table in which the management item type ID and the management item ID are set to be associated with each other, and the object management table in which the management item type ID is set to be associated with the process ID of the sub service function 102. Such an object ID enables the request distribution processing as illustrated in FIG. 16.

Figure 16:
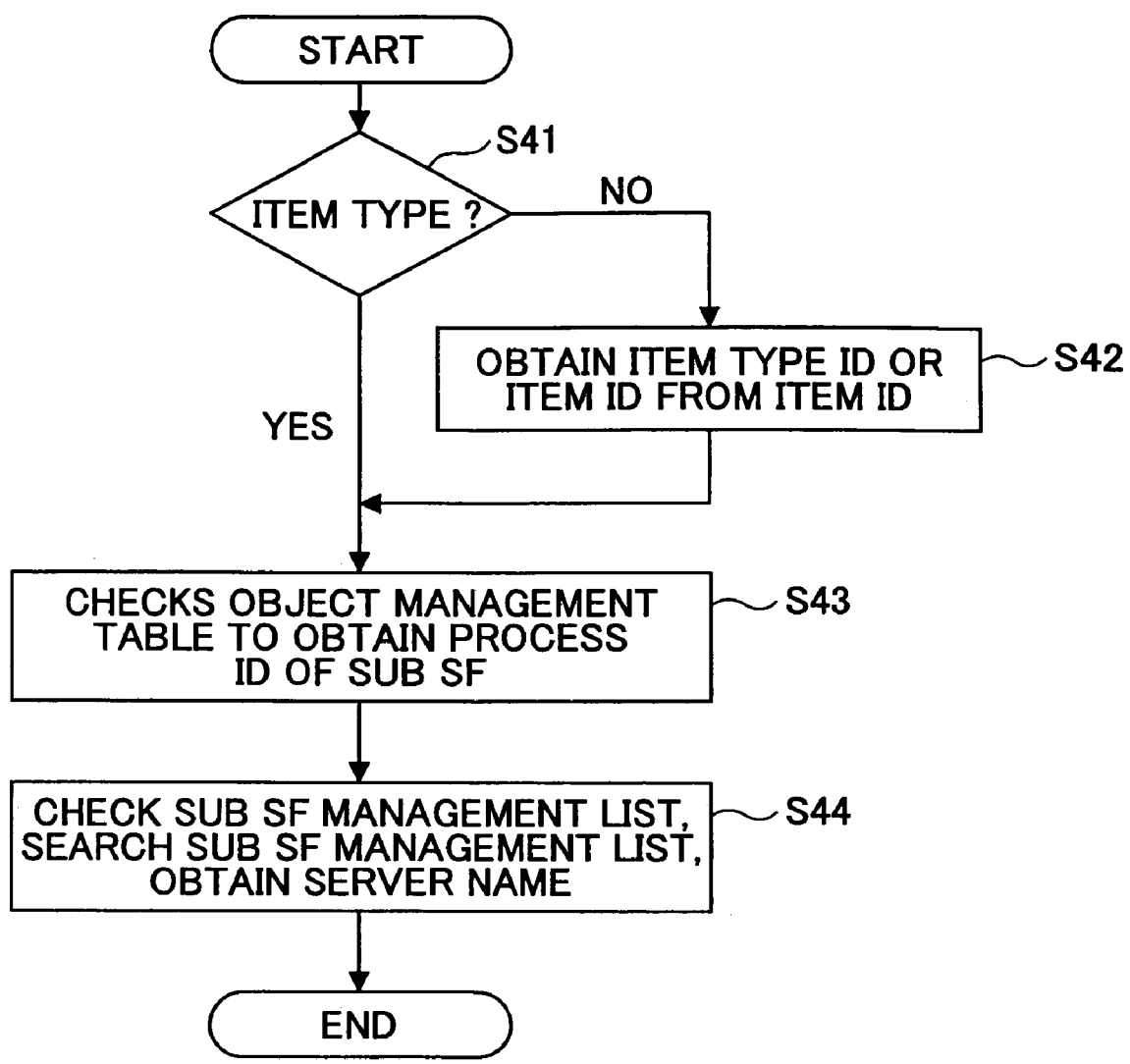
FIG. 16 is a flowchart illustrating still another example of the request distribution processing.

FIG. 16 is a flowchart illustrating still another example of the request distribution processing.

In step S41, the request distribution processor 207 determines which of a management item type and a management item the requested item is.

If it is determined that the requested item is a management item, the request distribution processor 207 proceeds to step S42. If it is determined that the requested item is a management item type, the request distribution processor 207 proceeds to step S43.

In step S42, the request distribution processor 207 obtains the management item type ID corresponding to the management item ID included in the request from the client.

In step S43, the request distribution processor 207 checks the object management table and obtains the process ID of the sub service function 102 associated with the management item type ID.

In step S44, the request distribution processor 207 checks the service function management object 203 with the process ID of the sub service function 102 as key information.

The service function management object 203 searches the sub service function management list 205 with the process ID of the sub service function 102 as key information, and obtains the server name of the service function processing client 206 from the service function process management list 204 associated with the sub service function management list 205 which is being searched. The service function management object 203 transmits the obtained server name to the request distribution processor 207.

Obtaining the server name of the service function processing client 206 capable of inter-process communication with the sub service function 102 corresponding to the request, the request distribution processor 207 can determine the sub service function 102 to which the request is assigned.

In the present embodiment, the service function 27 which processes requests for device management services is configured to include the master service function 101 and the sub service functions 102, and a sub service function 102 assuming the operating state can be registered in the master service function 101, so that it is possible to provide a service function 27 in correspondence to the configuration of the image formation device. In addition, in the present embodiment, the master service function 101 can assign a request to the sub service function 102, and the sub service function 102 can process the request.

In the above embodiment, there are two channels of inter-process communications between the master service function 101 and the sub service function 102, but the present invention is applicable even when there is only one channel of inter-process communications.

Figure 17:
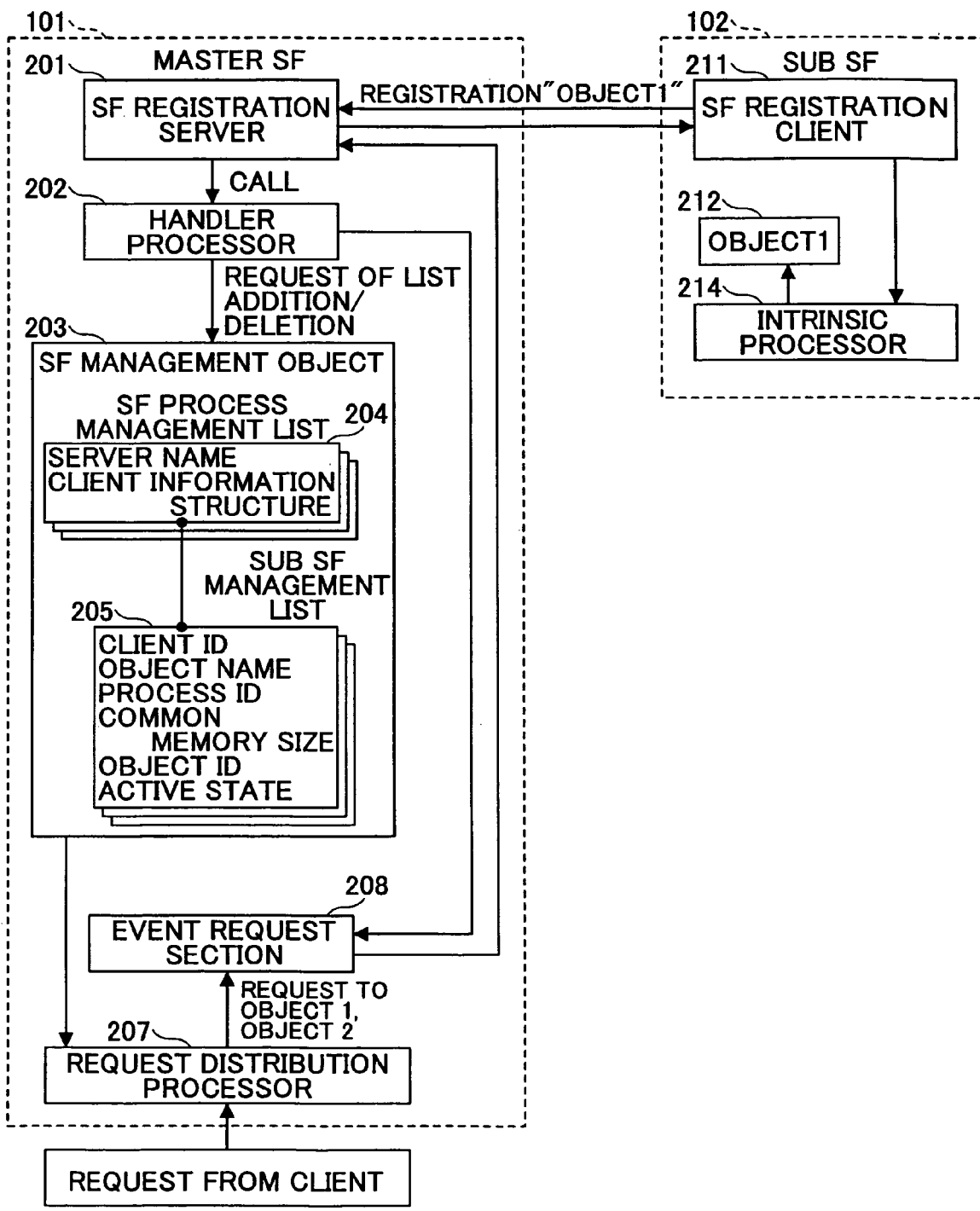
FIG. 17 is a block diagram illustrating another example of the configurations of the master service function 101 and the sub service function 102.

FIG. 17 is a block diagram illustrating another example of the configurations of the master service function 101 and the sub service function 102.

In FIG. 17, the same reference numbers are assigned to the same elements as those shown in FIG. 6, and overlapping descriptions are omitted appropriately.

As illustrated in FIG. 17, the master service function 101 includes a service function (SF) registration server 201, a handler processor 202, a service function (SF) management object 203, a request distribution processor 207, and an event request section 208. The service function management object 203 includes a service function (SF) process management list 204, and a sub service function (SF) management list 205.

The sub service function 102 includes a service function (SF) registration client 211, an object 212, and an intrinsic processor 214.

The master service function 101 and the sub service function 102 perform interactive control through inter-process communications. There is one channel of the inter-process communications between the master service function 101 and the sub service function 102. Specifically, the inter-process communications are performed between the service function registration client 211 of the sub service function 102 and the service function registration server 201 of the master service function 101.

The process of registering the service function registration client 211 of the sub service function 102 turning into the operating state in the service function registration server 201 of the master service function 101 is performed in the same way as shown in FIG. 6.

The handler processor 202 starts up the event request section 208 to allow generation of an event to the sub service function 102 in correspondence to the request.

On the other hand, the request distribution processor 207 receives the request for device management service from clients such as the Web service application 25 or others through the Web service function 26. The request distribution processor 207 checks the service function management object 203 with the object ID and an object class as key information to determine the event request section 208. For example, the request distribution processor 207 determines an event request section 208 which allows generation of an event to the sub service function 102 in correspondence to the request.

The request distribution processor 207 transmits the request from the client to the determined event request section 208. The event request section 208 generates an event from the service function registration server 201 of the master service function 101 to the service function registration client 211 of the sub service function 102. The service function registration client 211 transmits the request, which is received from the service function registration server 201 in the event, to the intrinsic processor 214. The intrinsic processor 214 directs the object 212 to perform processing in accordance with the request.

In this example, processing performed with two channels of inter-process communications can be realized by one channel of inter-process communications. That is, registration of the sub service function 102 in the master service function 101 and request distribution to the sub service function 102 can be executed through one channel of inter-process communications.

In claims, the "request type" is defined according to contents of requests (for example, version acquisition), items of requests (for example, timezone), and requests from a sub service function which is to process the request.

While the present invention is described above with reference to specific embodiments chosen for purpose of illustration, it should be apparent that the invention is not limited to these embodiments, but numerous modifications could be made thereto by those skilled in the art without departing from the basic concept and scope of the invention.

This patent application is based on Japanese Priority Patent Application No. 2004-279661 filed on Sep. 27, 2004, the entire contents of which are hereby incorporated by reference.

What is claimed is:

1. An image formation device, comprising:
a service function unit configured to process a request for a service function corresponding to a service provided by the image formation device, said service function unit including a master service function section and a plurality of sub service function sections,
wherein
each of the sub service function sections is configured to send a request to the master service function section to register the sub service function section with the master service function section as corresponding to a new operating state in response to assuming the new operating state;
the master service function section is configured to assign the received service function request to a selected one of the sub service function sections based on a type of the service function requested; and
the selected sub service function section is configured to process the service function request assigned to the selected sub service function section by the master service function section.

2. The image formation device as claimed in claim 1, wherein
each of the sub service function sections assuming the new operating state notifies the master service function section of a request type corresponding to the new operating state; and
the master service function section registers a correspondence relation between the request type and the respective sub service function section in a control unit.

3. The image formation device as claimed in claim 2, wherein the master service function section, using the correspondence relation stored in the control unit, assigns the service function request to one of the sub service function sections corresponding to the request type.

4. The image formation device as claimed in claim 2, wherein the master service function section processes the service function request in accordance with the request type.

5. The image formation device as claimed in claim 2, wherein the master service function section notifies the respective sub service function section of completion of processing of the service function request after the master service function section finishes processing of the service function request according to the request type.

6. The image formation device as claimed in claim 2, wherein
the respective sub service function section includes a registration client that transmits a registration request to the master service function section, and a processing server that receives the service function request from the master service function section;
the master service function section includes a registration server that receives the registration request from the respective sub service function section, and a processing client that transmits the service function request to the respective sub service function section; and
the master service function section and respective the sub service function section communicate with each other through two inter-process communication channels.

7. The image formation device as claimed in claim 2, wherein
the respective sub service function section includes a client that transmits a registration request to the master service function section and receives the service function request from the master service function section as an event;
the master service function section includes a server that receives the registration request from the respective sub service function section and transmits the service function request to the respective sub service function section as an event; and
the master service function section and the respective sub service function section communicate with each other through one inter-process communication channel.

8. The image formation device as claimed in claim 6, wherein
when it is determined that the respective sub service function section that transmits the registration request is not registered in the control unit, the master service function section initiates the processing client of the master service function section and the processing server of the respective sub service function section, and registers the respective sub service function section in the control unit.

9. The image formation device as claimed in claim 6, wherein
when it is determined that the respective sub service function section that transmits the registration request is registered in the control unit, the master service function section initiates the processing client of the master service function section and the processing server of the respective sub service function section.

10. The image formation device as claimed in claim 6, wherein when the master service function section receives a termination request from one of the sub service function sections, the master service function section registers invalidation of the one of the sub service function sections that transmits the termination request in the control unit.

11. The image formation device as claimed in claim 1, wherein each of the sub service function sections includes a plurality of objects, and and is configured to send a registration request for each of the objects.

12. The image formation device as claimed in claim 11, wherein the master service function section assigns the service function request to one of the sub service function sections according to an object identifier included in the service function request.

13. The image formation device as claimed in claim 11, wherein the master service function section assigns the service function request to one of the sub service function sections according to an identifier of a sub service function section included in the service function request.

14. The image formation device as claimed in claim 11, wherein the master service function section assigns the service function request to one of the sub service function sections according to an identifier of a requested service function included in the service function request.

15. The image formation device as claimed in claim 6, wherein a correspondence relation between the processing server and one or more of an object identifier, an identifier of one of the sub service function sections, and an identifier of a requested service function is registered in the control unit.

16. The image formation device as claimed in claim 6, wherein the master service function section registers the correspondence relation between the request type and one of the sub service function sections in a storage unit by a handler process called out from a library of the registration server.

17. The image formation device as claimed in claim 1, wherein the service function request processed by the master service function section and the sub service function sections is a request for a device management service function.

18. The image formation device as claimed in claim 17, wherein
when the service function request is for all device management service functions, the master service function section processes the service function request, and
when the service function request is a request including a specified management item or a specified type of the management item, the master service function section assigns the service function request to one of the sub service function sections.

19. The image formation device as claimed in claim 1, wherein the master service function section receives the service function request from a process of a Web service layer.

20. A method of an image formation device, said image formation device including a service function unit configured to process a request for a service function corresponding to a service provided by the image formation device, said service function unit including a master service function section and a plurality of sub service function sections, said method comprising:
sending requests, using the sub service function sections to the master service function section to register the sub service function sections as corresponding to new operating states in response to the sub service function sections assuming the new operating states;
assigning, using the master service function section, each received service function request to a selected one of the sub service function sections based on a type of the service function requested; and
processing, using the selected one of the sub service function sections, the service function request assigned by the master service function section.

21. A computer readable medium having stored therein a program for executing method on an image formation device, said image formation device including a service function unit configured to process a request for a service function corresponding to a service provided by the image formation device, said service function unit including a master service function section and a plurality of sub service function sections, said method comprising:

sending requests from the sub service function sections to the master service function section to register the sub service function sections as corresponding to new operating states in response to the sub service function sections assuming the new operating states;

directing the master service function section to assign each received service function request to a selected one of the sub service function sections based on a type of the service function requested; and directing the selected one of the sub service function sections to process the service function request assigned by the master service function section.

* * * * *